Figure 1:
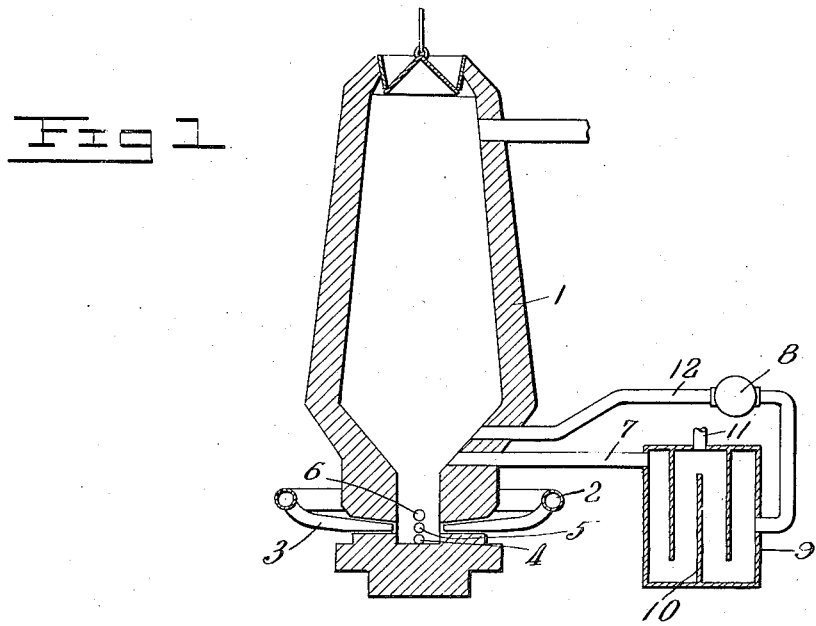

A. C. SPENCER & K. P. McELROY.
PROCESS OF MAKING CYANIDS.
APPLICATION FILED JUNE 3, 1911.

1,156,108.

Patented Oct. 12, 1915.

Witnesses

Inventors
A. C. Spencer
K. P. McElroy
By K. P. McElroy
Attorney

UNITED STATES PATENT OFFICE.

ARTHUR C. SPENCER AND KARL P. McELROY, OF WASHINGTON, DISTRICT OF COLUMBIA.

PROCESS OF MAKING CYANIDS.

1,156,108. Specification of Letters Patent. Patented Oct. 12, 1915.

Application filed June 3, 1911. Serial No. 630,973.

*To all whom it may concern:*

Be it known that we, ARTHUR C. SPENCER and KARL P. McELROY, citizens of the United States, residing at Washington, in the District of Columbia, have invented certain new and useful Improvements in Processes of Making Cyanids, of which the following is a specification.

This invention relates to processes of making cyanids; and it comprises processes of preparing potassium cyanid wherein a mixture of a mineral comprising a potassium silicate with slag forming bodies and with oxidized iron compounds is treated in a blast furnace to produce slag, reduced iron and potassium cyanid; all as more fully hereinafter set forth and as claimed.

At temperatures around a white heat atmospheric nitrogen will combine with various bases in the presence of carbon to form cyanids of such bases. The reaction is fairly ready with potassium, sodium and barium but much less ready with calcium. In all cases however the reaction requires a high temperature and absorbs much heat; which renders the practical utilization of the reaction a matter of extreme difficulty, especially as the reaction mixture is quite corrosive. Iron and steel are hardly suitable for containers or retorts to contain the reaction mixture both because the required reaction temperature is rather high and because the mixture after the formation of some cyanid becomes corrosive to iron while with clay retorts and the like, apart from difficulties due to corrosion, the conveyance of heat through the walls is too slow to permit the delivery of the great volume of heat units required in the reaction. The presence of iron in the mixture facilitates the cyanid-forming reaction; and this property is utilized in the present invention. The iron may be, and advantageously is, reduced to metal to form a valuable by-product.

In the present invention a cyanid-forming charge is prepared comprising iron oxid, free or combined carbon, a mineral containing potassium silicate and sufficient lime or limestone to slag off the silica and alumina present and to form a substantial body of slag. Part or all of the iron may be allowed to enter the slag. This mixture is treated in a shaft furnace provided with twyers through which an air blast, cold or hot, is blown, the furnace being run ordinarily under such conditions as to permit the formation of metallic iron and molten slag. It is better that the charge components be not too finely ground or intimately mixed since this would impede the draft, but such fine material may be worked in furnaces of moderate height. Under the conditions, the oxygen of the air blown in is converted into carbon monoxid, (which is not oxidizing to potassium cyanid) with development of intense heat. In round terms, the oxidation of carbon to monoxid develops about 30 per cent. of the total heat of combustion, the remainder being developed on the combustion of the carbon monoxid to dioxid; and the heat of this semi-oxidation to carbon monoxid is amply sufficient for the present purposes.

In the present invention, internally developed heat is relied upon and the walls of the furnace may be of any material which will withstand corrosion, irrespective of its heat-conducting properties, such as magnesia, silica, alumina, etc.; or the furnace may be of steel and be water-jacketed. The furnace should be lined with material resistant to the particular slag produced. With a water-jacketed metal furnace, the chilling of charge materials may be used to produce a lining.

As so far described, the operation is that of a gas producer, air being robbed of its oxygen to produce a mixture of carbon monoxid and free nitrogen with development of heat. An excess of carbon is however employed in the charge in the present invention and, if adequate amounts of basic radicals be present, part of this reduces the iron oxids present with formation of metallic iron (as in the ordinary blast furnace). This iron facilitates the cyanid-forming reaction. The excess of carbon further reduces the potassium compounds to metallic potassium, which *in statu nascendi* combines with the carbon and with the nitrogen of the gas mixture to form potassium cyanid, which, under the heat conditions may be partly or wholly in a volatilized condition, or may be partly in a molten condition. The silica, alumina and lime of the charge form a slag bath which overlies the molten reduced iron while underlying the molten cyanid, if any be present. Molten cyanid is not particularly miscible with molten slag; and the layer or molten slag forms a volatilizing bath for the molten cyanid.

The cyanid fumes unless special precautions be taken will ascend in the shaft and be wasted in reducing iron in the upper relatively cooler sections of the charge in which they are also largely condensed. The carbon monoxid from the lower portion of the furnace also acts as a reducing body upon the iron, forming metallic iron and carbon dioxid, which latter has an oxidizing action upon the cyanid fumes. The carbon dioxid from the limestone, if such be in the charge also has an oxidizing effect. If the furnace be run as an ordinary blast furnace is run, much of the potassium of the charge will uselessly circulate between the lower and upper portions of the material, becoming cyanided in the lower portion, ascending and becoming reoxidized above and again descending, and so on. Some portion of the potassium will go forward as fumes with the outflowing gases and may be recovered, but it is apt to be carbonate rather than cyanid. If the furance charge be run at a comparatively low temperature some portion of the cyanid may be tapped off in a molten condition at a point above the slag notch, or through the slag notch after the slag has been drawn off. The possibility of low temperature depends upon proportioning the charge with a view to making a readily fusible slag.

To tap off the gases and fumes at a point above the slag bath and wholly remove them would be to destroy the most advantageous operation of the furnace since the conveyance of heat to the upper portion of the charge and the reduction of iron by carbon monoxid are there desirable. But it is practicable to remove some or all the gases at this point, pass them through a fume collector in which their temperature is not lowered greatly, to abstract and remove the potassium cyanid and then reintroduce the gases into the furnace. It is not necessary that all the gases be removed, as may be done by providing the furnace with a constriction and removing and returning gases below and above this; it is sufficient if a substantial amount of gases be removed from the furnace chamber and returned. This operation may be, and advantageously is, continuous. Suitable points in the shaft chamber may be provided with gas inlets and outlets, and these connected with a closed circuit comprising a fume collecting device and a circulating device, such as a water-cooled fan. Gases will be removed, passed through the fume collector and returned to the furnace. With a sufficiently rapid circulation in this closed circuit, the amount of cyanid vapors in the furnace chamber at any given time may be kept at a minimal amount without disturbing the normal upward movement of the furnace gases therethrough. The amount of cooling of the gases needed to abstract the cyanid from the circulating gases does not materially disturb thermal conditions in the furnace. The speed of the fan, and consequently, the amount of gases removed, purified and returned per second, may be as desired. Advantageously, the inlets and outlets are located some distance above the twyers but some distance below the cooler portions of the charge.

Any ordinary type of fume collector, such as baffle chambers, chambers containing bars, etc., may be employed. It is not advantageous to cool beyond the point where cyanid fumes will condense since it is best to send the gases back to the furnace chamber as hot as may be in order not to interfere with the normal producer working. Return of some cyanid uncondensed does no harm and results in no loss. A steam or water spray using limited amounts of moisture may be employed to aid in fume condensation; but such moisture may cool the gases too much and may break up the cyanid more or less.

Instead of the described method of removing gases and fume from an intermediate point in a single furnace chamber having a lower hot zone and an upper relatively cool zone, another method may be employed and the charge-treatment separated into two stages performed in separate chambers. For this purpose a primary furnace chamber or cyaniding chamber may be made as a relatively short and low shaft chamber, the proportions being so chosen that gases and fumes may emerge through the charge at its upper surface in a very hot condition, the gases carrying the cyanid fumes. For this purpose, the charge must of course be hot to and including its upper surface. The emerging gases and fumes may, as before, be led through a fume collector to remove cyanid and may then be led into contact with fresh, comparatively cool charge materials, giving up their heat and rendering the charge fit for introduction into the hot zone. The coal or coke is best added after the preheating step.

In performing this separate-stage operation, in the second stage some air may be supplied and the hot combustible gases may be passed into contact with and through the charge in a state of active combustion. The amount of air is of course not so great as to cause freely oxidizing conditions in the portion of the charge as the object is to maintain substantially blast furnace conditions throughout the charge. This enables the development of more heat which is particularly useful if limestone, instead of lime, be employed as a component of the charge, the calcining of limestone being an operation requiring much heat. Here again the calcined ore is charged with carbonaceous fuel into the reduction chamber.

It has been found to be advantageous in some cases to work primarily for the recovery of as much as possible of the cyanid in molten form. Precautions to be followed in this case are: to provide a low melting point slag which diminishes the volatilization rate of the cyanid; to provide considerable depth of charge; and to promote the return of volatilized cyanid and alkali to the reduction zone of the furnace. Working in this way the rapid accumulation of molten cyanid is promoted, and the escape of alkali with the waste gases is reduced to a minimum.

Many mixtures of many materials may be employed in the present invention; but the charge should contain carbon, which may be in the form of coke, anthracite, charcoal, etc., lime or limestone or dolomite and a mineral containing a silicate of potassium. The lime should be in amount to combine with the silica and alumina (if present) of the mineral to form a readily fusible slag; and the amount of silica and lime should be sufficient to provide an ample amount of slag. There should be enough oxidized iron in the charge to allow the steady production and removal of some pig iron; though this amount need not be great. As pig iron is a valuable by-product, there is no particular desirability in lessening the amount produced, though ferrous oxid tends to promote slag fluidity so that part of the iron may be advantageously allowed in certain cases to enter the slag. Since iron takes the place of lime or magnesia, less limestone is required if part of the iron be so utilized, and the sheer amount of alkali of the charge is concomitantly raised. The potassium mineral may be one which carries both potassium and iron, as well as silica, as for instance glauconite, (green sand); or it may be one of the feldspars, leucite or the like. But if it be a non-ferruginous silicate it is better to add some form of iron oxid, such as ore, mill scale, finery slag, etc. The presence of iron is not indispensably necessary to the operation, but it is very advantageous. The present invention may, for instance, be practised with a charge carrying feldspar or leucite, limestone and carbon; but the action goes on better and more smoothly if iron oxid in some form be added. A mixture of greensand and feldspar is often convenient for mineral component of the charge. Rocks high in soda or rich in both soda and potash may be employed. Such rocks as camptonite and nephelite syenite are particularly useful for the process as they are often low in silica and high in alkali constituents. Limy greensand marls may be employed with advantage.

A good charge for some types of furnace may be made from 1600 pounds greensand containing, say, 10 per cent. potash and 20 per cent. iron, 500 to 900 pounds coke, and 720 pounds of limestone. The bulk of the iron will be recovered as metal. Another charge may be made of 1200 pounds feldspar containing say 15 per cent. potash and say 800 pounds coke and 1440 pounds of limestone. This latter charge is however improved by adding iron ore in the amount of 250 pounds, the coke being correspondingly heightened. Or 650 pounds of greensand may be taken with 650 pounds of feldspar and, say, 1260 pounds of limestone.

As one example of a useful charge, I may take camptonite of the following composition:

| | |
|---|---|
| $SiO_2$ | 40.70 |
| $Al_2O_3$ | 19.43 |
| $Fe_2O_3$ | 7.46 |
| $FeO$ | 6.83 |
| $MgO$ | 6.21 |
| $CaO$ | 11.43 |
| $MnO$ | .18 |
| $K_2O$ | 3.26 |
| $Na_2O$ | 1.80 |
| Ignition and loss | 2.70 |
| | 100.00 |

This material may be worked with or without addition of limestone. By merely melting under blast furnace conditions, and provided all of the contained alkali and iron are precluded from entering the slag, this material will give a slag of about 45 per cent. silica, 21 alumina, 13.5 ferrous oxid, 7 magnesia and 13 lime. Treatment of this simple charge is less economic however than that of a charge carrying more lime, as the alkalis tend to enter the slag and curtail the amount of cyanid recoverable. By providing a charge comprising 2000 pounds of the camptonite rock and 575 pounds of limestone, there are secured 2000 pounds of slag, about 135 pounds of pure iron in the form of pig iron and a certain amount of alkali products. The composition of the slag will be about as follows: Silica 40.9 per cent., magnesia 6.2 per cent., soda 0.8 per cent., lime 27.5 per cent., alumina 17.0 per cent., ferrous oxid 6.6 per cent. and potash 1.0 per cent.; or a total of 100 per cent. Further addition of lime will promote a further conversion of alkali. Limestones may be selected which will carry upward of a per cent. of potash.

In the accompanying illustration are shown, more or less diagrammatically, certain forms of apparatus elements adapted for use in the described invention.

Figure 2:
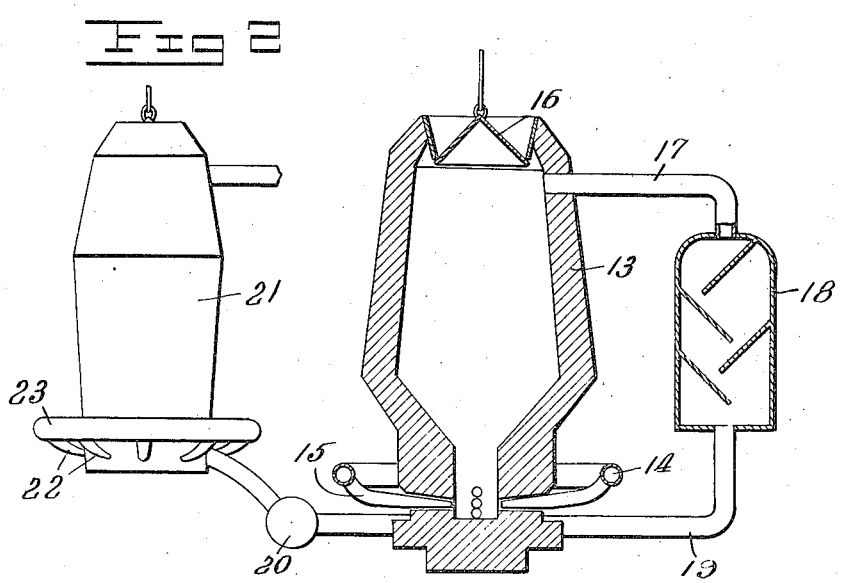

In this showing, Figure 1 is a vertical section of a simple blast-furnace like structure provided with closed-circuit circulation of gases; and Fig. 2 is a similar view of a pair of connected furnace chambers.

In the showing of Fig. 1, element 1 is a structure like an ordinary blast furnace, being provided with bustle pipe 2, air twyers 3, metal notch 4 and slag notch 5. Above the latter is cyanid notch 6. At a point between the twyers and the boshes is provided a gas outlet conduit 7 with water-cooled fan 8. The gases are introduced into a simple fume collector 9 provided internally with baffles 10. There may be a water or steam spray nozzle 11 to aid in condensation. From the fume collector the gases pass through conduit 12 back into the furnace chamber.

The structure of Fig. 2 is somewhat more complicated in structure and operation. There is a cyanid furnace 13 provided with bustle pipe 14, twyers 15, charging bell 16 and gas outlet 17 located near its top; that is above the normal level of the charge therein. The gas outlet leads to a simple form of baffle chamber fume collector 18, from which conduit 19 and fan 20 pass the still hot gases into a second heating or calcining chamber 21, which may also be provided with air twyers 22 from bustle pipe 23. The charge preheated in 21 may be delivered by any suitable means (not shown) to the top of 13.

Other alkalis may be used in lieu of potassium compounds. Minerals comprising soda silicate may be used, or minerals comprising potash and soda both in silicate combination. Lithium minerals, such as lithia mica, may be used. Barium minerals do not give as freely volatile cyanid as potassium minerals. Strontium minerals are less desirable. Calcium compounds under the conditions of the operation do not react to any great extent; most of the calcium in the charge going to the slag as silicate. In lieu of potassium minerals, such as feldspar, leucite, etc., rocks containing the same may be employed, such as granite, which contains quartz with potassiferous feldspar and mica.

Leucite basalt which carries no free silica is a particularly desirable material for making cyanid. As stated above, it may be worked in charges with or without the addition of iron ore.

Where pulverulent material is to form a large part of the charge the preheating chamber may be a rotatable cylinder of the type of the ordinary cement kiln. Here, or in any other type of preheating chamber, a certain amount of carbonaceous material may be advantageously used with the charge to bring about preliminary reduction. It is well known that iron is reduced from peroxid ores at comparatively low temperatures, and by employing this preliminary reduction the heat required in the cyanid chamber is materially diminished, or such heat as is there developed is left available for the cyanid reaction proper and for volatilizing the cyanid as formed.

We claim—

1. In the manufacture of cyanids, the process which comprises passing an ignited mixture comprising carbon, slag forming substances and a native mineral comprising silicate of alkali downward against an upward blast of air under gas producer conditions throughout such passage and collecting the cyanid formed.

2. In the manufacture of cyanids, the process which comprises passing an ignited mixture comprising a natural silicate containing alkali, slag-forming substances, carbon and a reducible iron compound downward against an upward blast of air under gas producer conditions and collecting the cyanid formed.

3. In the manufacture of cyanids, the process which comprises passing an ignited mixture comprising a natural silicate containing potash, slag-forming substances and carbon downward against an upward blast of air under gas producer conditions and collecting the cyanid formed.

4. In the manufacture of cyanids, the process which comprises passing an ignited mixture comprising a natural silicate containing potash, slag-forming substances, carbon, and a reducible iron compound downward against an upward blast of air under gas producer conditions and collecting the cyanid formed.

5. In the manufacture of cyanids, the process which comprises passing an ignited charge downward through a shaft chamber against a blast of air and under gas producer conditions, said charge comprising a silicate containing alkali, slag forming substances, a reducible iron compound and carbon, and withdrawing a current of vapors and gases from a point of high temperature in the progress of said charge, abstracting alkali cyanid from said current and returning the current to the chamber and charge.

6. In the manufacture of cyanids, the process which comprises passing a charge comprising cyanid-forming materials downward through a shaft chamber against a blast of air and under gas producer conditions while circulating a current of gases and vapors from a hot point in said charge to and through cyanid recovering means and back to said charge.

7. In the manufacture of cyanids, the process which comprises advancing a charge of cyanid-forming materials comprising carbon and basic components under gas producer conditions against air and gases passing in an opposite direction, abstracting a current of gases from a hot portion of said advancing charge, cooling the current slightly to cause deposition of cyanid vapors and returning the current into contact with the charge.

8. In the manufacture of cyanids, the process which comprises transmitting a charge comprising alkali-containing material and carbon to and through a zone of intense heat, introducing air into said charge in the amount sufficient to maintain said heat in said zone by semi-combustion of carbon to carbon monoxid, withdrawing hot gases from the charge in said zone, passing the withdrawn gases through cyanid-abstracting means and returning the gases so treated into contact with the charge.

9. In the manufacture of cyanids, the process which comprises transmitting a charge comprising a silicate containing alkali, slag-forming substances and carbon to and through a zone of intense heat, introducing air into said charge in the amount sufficient to maintain said heat in said zone by semi-combustion of carbon to carbon monoxid, withdrawing hot gases from the charge in said zone, passing the withdrawn gases through cyanid-abstracting means and returning the gases so treated into contact with the charge.

10. In the manufacture of cyanids, the process which comprises transmitting a charge comprising a silicate containing alkali, slag-forming substances, a reducible iron compound and carbon to and through a zone of intense heat, introducing air into said charge in the amount sufficient to maintain said heat in said zone by semi-combustion of carbon to carbon monoxid, withdrawing hot gases from the charge in said zone, passing the withdrawn gases through cyanid-abstracting means and returning the gases so treated into contact with the charge.

11. In the manufacture of cyanids, the process which comprises passing a charge comprising carbon, a reducible iron compound, a silicate containing potash and slag-forming substances downward through a blast furnace against a blast of air while cooling said gases to cause deposition of potassium cyanid and returning the gases to the furnace chamber to join the normal circulation therethrough.

12. In the manufacture of cyanids and iron, the process which comprises passing a charge comprising carbon, greensand and slag forming materials downward through a blast furnace against an upwardly passing blast of air, and separately collecting the iron, cyanid and slag formed.

In testimony whereof, we affix our signatures in the presence of witnesses.

ARTHUR C. SPENCER.
K. P. McELROY.

Witnesses:
PHILIP F. LARNER,
WM. H. SOMERVELL.